US007010791B2

(12) United States Patent
Cierniak

(10) Patent No.: US 7,010,791 B2
(45) Date of Patent: Mar. 7, 2006

(54) METHOD FOR IMPLEMENTING MULTIPLE TYPE HIERARCHIES

(75) Inventor: Michal J. Cierniak, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 664 days.

(21) Appl. No.: 09/961,048

(22) Filed: Sep. 20, 2001

(65) Prior Publication Data

US 2003/0088578 A1    May 8, 2003

(51) Int. Cl.
  *G06F 9/44*    (2006.01)
(52) U.S. Cl. ...................................... 719/315
(58) Field of Classification Search ............... 719/315, 719/316; 717/116, 118, 166, 170; 707/103 R, 707/203
  See application file for complete search history.

(56) References Cited

U.S. PATENT DOCUMENTS

| 5,327,562 | A | * | 7/1994 | Adcock ..................... 717/141 |
| 5,442,793 | A | * | 8/1995 | Christian et al. ........... 719/315 |
| 5,630,087 | A | * | 5/1997 | Talluri et al. ............... 711/202 |
| 5,689,709 | A | * | 11/1997 | Corbett et al. ............. 719/315 |
| 5,701,485 | A | * | 12/1997 | Guillen et al. ............. 719/315 |
| 5,768,588 | A | * | 6/1998 | Endicott et al. ........... 719/316 |
| 5,794,041 | A | * | 8/1998 | Law et al. .................. 717/104 |
| 5,805,885 | A | * | 9/1998 | Leach et al. ............... 719/316 |
| 5,960,197 | A | * | 9/1999 | Segnan ....................... 717/116 |
| 6,044,380 | A | * | 3/2000 | Gerard et al. ........... 707/103 R |
| 6,052,528 | A | * | 4/2000 | Dechamboux .............. 717/116 |
| 6,112,253 | A | * | 8/2000 | Gerard et al. ............... 719/315 |
| 6,182,155 | B1 | * | 1/2001 | Cheng et al. ............... 719/315 |
| 6,182,282 | B1 | * | 1/2001 | Stoodley et al. ........... 717/116 |
| 6,393,491 | B1 | * | 5/2002 | Bracha et al. .............. 719/315 |
| 6,412,019 | B1 | * | 6/2002 | Gibbons et al. ............ 719/315 |
| 6,427,162 | B1 | * | 7/2002 | Mohamed ................... 718/108 |
| 2003/0014555 | A1 | * | 1/2003 | Cierniak .................... 709/315 |

FOREIGN PATENT DOCUMENTS

EP    0365309 A2 *    4/1990

OTHER PUBLICATIONS

J. Boyland, et al, "Parasitic methods: an implementation of multi-methods for Java", ACM, 1997. pp. 66-76.*
S. Stephens, et al "An object-oriented approach to software design for distributed real-time computing systems", IEEE, 1993, pp 297-303.*
"C++ Compiler Implementation for Virtual Functions with Varying Return Types", IBM Technical Disclosure Bulletin, Jun., 1995.*
Gosling, J., et al., The Java™ Language Specification, Second Edition, Addison-Wesley, 1999, Cover Page-505 pp.
Lindholm, T., et al., The Java Virtual Machine Specification, Second Edition, Addison-Wesley, 1999, 302 pp.
ECMA, C# Language Specification, Standard ECMA-334, Dec. 2001, Cover Page-479 pp.
ECMA, Common Language Infrastructure (CLI) Partitions I to V, Standard ECMA-335, Dec. 2001, 514 pp.

* cited by examiner

*Primary Examiner*—Sue Lao
(74) *Attorney, Agent, or Firm*—Blakely, Sokoloff, Taylor & Zafman LLP

(57) ABSTRACT

A system and method of unifying data structures is described. Equivalent data structures are combined so that multiple programming languages can recognize the data structure. One embodiment includes a data structure. The data structure includes a pointer to a vtable. The vtable includes at least one pointer. The pointer points to one or more classes and at least one of the classes includes a unified type hierarchy.

18 Claims, 5 Drawing Sheets

METHOD FOR IMPLEMENTING MULTIPLE TYPE HIERARCHIES

FIELD OF THE INVENTION

The present invention relates to computer software programming techniques and more specifically to a method of simplifying software.

BACKGROUND OF THE INVENTION

Many object-oriented computer programming languages share several similar structures and often share equivalent functions or methods. Each object-oriented computer programming language has a hierarchy of data types or objects. The hierarchy of data types includes every data type used in the language. Each data type in each language is a sub-class of the respective language. For example, both Java and C# (C-sharp) languages have similar hierarchical structures in that both have a top-level hierarchy called a class and the top-level class is referred to as an "Object" (i.e. in Java: java.lang.Object and in C#: System.Object).

FIGS. 1 and 1A show the similar hierarchical structures of Java and C# respectively. A graphical representation of the hierarchy of data types for a single object-oriented language can be presented as an inverted tree with a "root" object 110, 150 at the top and each sub-class appearing as a branch extending downward from the language object. Additional layers of sub-classes can extend from each sub-class. Each class (and the sub classes that fall below the class) share common characteristics. The characteristics include the type of functions that can be performed in each class or sub-class or sub-sub-class. For examples: in FIG. 1 a Java root class 110 is presented. The Java root class 110 includes several fields including a Java name 111 that identifies the object as a Java object. A field identifying the number of methods 112 and a field with links 114 to the actual Java methods 120, 130. Each Java method 120, 130 also includes a Java name 121, 131 and an implementation of the actual method 123, 133 including the actual code of the respective Java method 120, 130.

Similarly, FIG. 1A shows a C# root object 150. The C# root object 150 includes several fields including a C# name 151 that identifies the object as a C# object. A field identifying the number of methods 152 and a field with links 154 to the actual C# methods 160, 170. Each C# method 160, 170 also includes a C# name 161, 171 and an implementation of the actual method 163, 173 including the actual code of the respective C# method 160, 170.

As object-oriented programming languages all serve similar goals: i.e. modularized programming, then inevitably many similar and often identical data types, methods and sub-classes of objects are found in the various object-oriented programming languages. However, often certain languages include unique classes or methods that are not easily implemented in another language. For example, Java may more easily allow a function that C# does not allow easily.

BRIEF DESCRIPTION OF THE DRAWINGS

The present invention is illustrated by way of example and not limitation in the figures of the accompanying drawings in which like references indicate similar elements.

DETAILED DESCRIPTION

A system and method of unifying data structures is described. Equivalent data structures are combined so that multiple programming languages can recognize the data structure. One embodiment includes a data structure. The data structure includes a pointer to a vtable. The vtable includes at least one pointer. The pointer points to one or more classes and at least one of the classes includes a unified type hierarchy.

Often several different hierarchical programming languages are used to develop a particular software application. Multiple languages are often used because an implementation of a particular class or method is more easily allowed or available in one programming language than in another programming language. For example a method may be available in Java that a C# programmer wishes to use. Conversely, a programmer may be updating a previously written Java program to include a new method that is implemented in C# or another hierarchical language.

As will be described in more detail below, Java and C# are used as merely examples to illustrate the various embodiments. Other object-oriented languages such as C++, Smalltalk, and Eiffel, and others could also be used similar to how Java and C# are described herein. In addition, while the various embodiments are described using only two object-oriented languages, more than two object-oriented languages could also be used and still be within the scope of the described embodiments.

Figures 1, 1A:
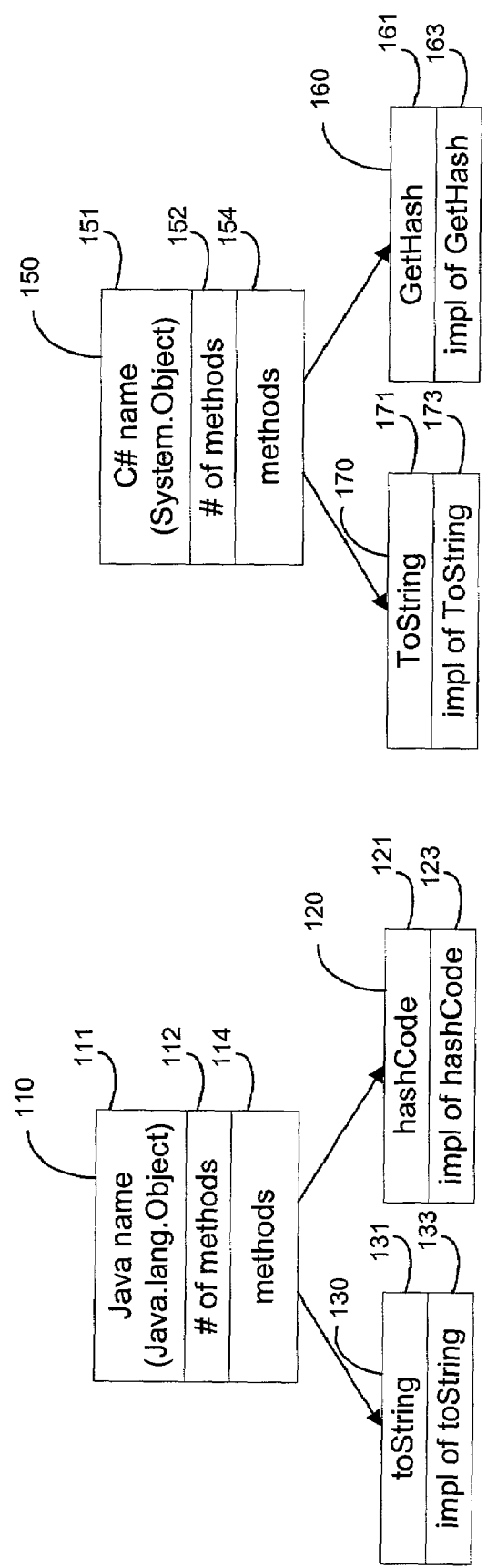
FIGS. 1 and 1A show the similar hierarchical structures of Java and C# respectively.
Figure 1B:
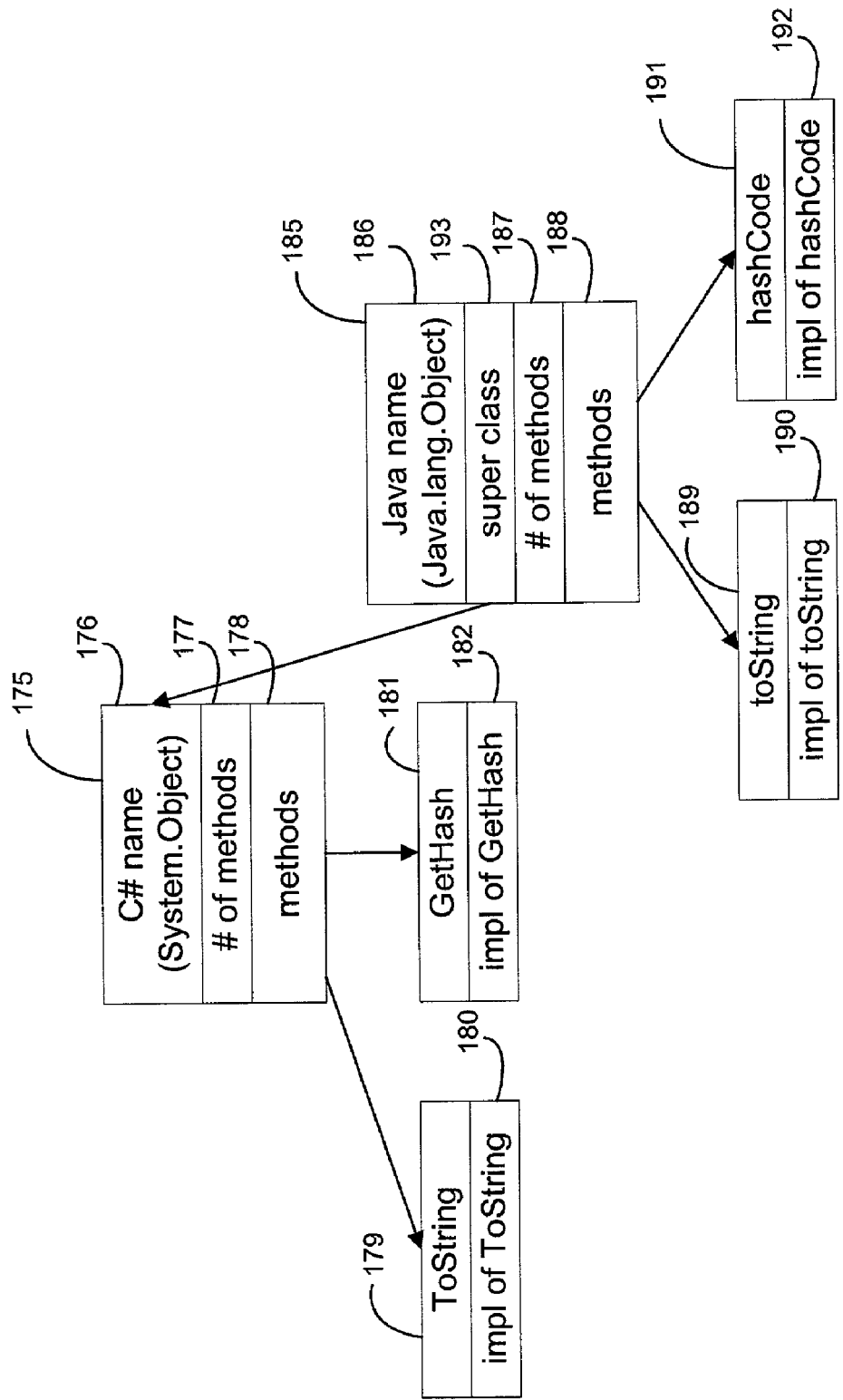
FIG. 1B shows one embodiment of a Java object that has been added to a C# program.

FIG. 1B shows one embodiment of a Java object 185 that has been added to a C# program. A C# object 175 is the root object which identifies the program as a C# program. The C# root object includes many fields such as a C# name 176, a number of methods 177, and links to or implementations of the methods 178. Two methods 179, 181 are linked to the C# root object 175. Of course one skilled in the art would recognize that many more methods could also be linked to the C# root object 175. The first method 179 is a C# method entitled ToString, or more properly "System.Object.ToString", but truncated to "ToString" for ease of discussion. ToString is a C# method of converting input data to a string. The first method 179 also includes an implementation 180 (or a link thereto) of the actual software code for performing the ToString method.

The second method 181 is entitled GetHash and is a C# method of hashing input data. GetHash is a truncated reference to the C# method "System.Object.GetHash". The GetHash method also includes an implementation 182 (or a link thereto) of the actual software code for performing the GetHash method.

A Java class object 185 includes a Java header "Java.lang.object" that identifies the class 185 as a Java class object. The Java class object 185 also includes a "super class" 193 which points to or links to the C# root object 175. The Java class object 185 also includes a third and a fourth method 189, 191. The third method 189 entitled "toString", is a Java method of converting the input data to a string. toString is a truncated reference to the Java method "java.lang.Object.toString". The toString method 189 also includes an implementation 190 (or a link thereto) of the actual software code for performing the toString method. The fourth method 191 entitled "hashCode," is a Java method of hashing the input data. hashCode is a truncated reference to the Java method "java.lang.Object.hashCode". The hashCode method 191 also includes an implementation 192 (or a link thereto) of the actual software code for performing the hashCode method.

As often happens, the C# GetHash method 181 and the Java hashCode method 191 have exactly identical implementations in that the actual software codes 182, 192, respectively, for performing the GetHash 181 and hashCode 191 methods are identical. However, the implementations of the Java tostring method 189 and the C# ToString method 179 are similar but not identical. In the example shown in FIG. 1B it is likely that the programmer desired to include the precise functionality of the Java toStringe method 189 into a C# program.

However, this embodiment also illustrates how duplicated software code for the Java hashCode method 192 and the C# GetHash method 182 can be included. Duplicate software code can cause excess complication and poor utilization of the memory of the computer that ultimately runs the software. Excess complication and poor utilization of the memory can cause the software to be less robust and more prone to causing a computer to crash. In addition, more complicated software is more difficult to maintain, i.e. update, modify, etc.

Another embodiment includes a shared or unified data structure system where the data type hierarchies from two or more languages are implemented in a a single, unified data type hierarchy. In one embodiment, all objects are subclasses of the same class, Unified Object. The Unified Object will appear to be of type java.lang.Object to Java code and System.Object to C# code.

Figure 2:
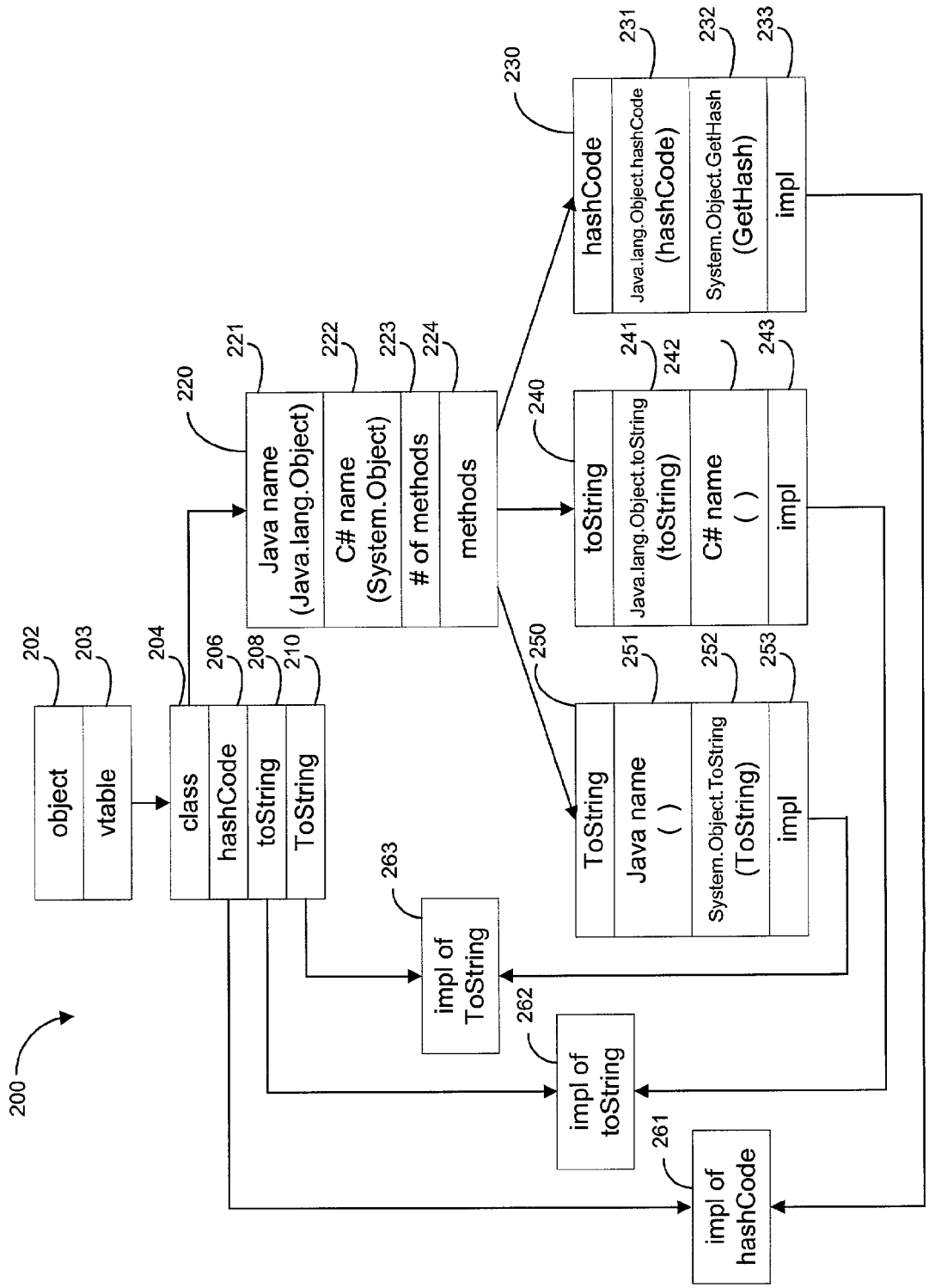
FIG. 2 illustrates one embodiment of a unified data structure.

FIG. 2 illustrates one embodiment of a unified data structure or object 202. The unified object 202 also includes a vtable 203 for virtual method dispatch and type identification. In one embodiment, a hidden field with a vtable pointer is included in every object. The vtable 203 contains a pointer to the structure representing the class 204 information and pointers to implementations of all instance methods 261, 262, 263 that may be invoked through the virtual dispatch mechanism. In an alternative embodiment, the structure representing the class 204 may also be directly included in the vtable 203.

The class data structure 220 of one embodiment includes a pointer to the Java name of the class 221, a pointer to the C# name of the class 222, and a pointer to the array of method pointers 224. A different name is needed for each language used. As shown, Java and C# names are included so that, from the point of view of Java programs, the same unified class is called java.lang.Object and from the point of view of the C# programs, the unified class is called System.Object. The class data structure can also include other fields.

Also as shown in FIG. 2, the array of method pointers 224 includes three methods 230, 240, 250. A first pointer points to the data structure for the hashCode method 230. This method is available from Java under the name of java.lang.Object.hashCode and from C# under the name System.Object.GetHash. Because both names are available for reflection the method is a Java-and-C# method and includes both Java (java.lang.Object.hashCode) 231 and C# (System.Object.GetHash) 232 names in the respective fields. The hashCode method 230 can also include a pointer to a hashCode method implementation 261. A second method 240 is the toString. The toString method 240 is available from Java only (i.e. a Java-only method), so the toString method's Java name (java.lang.Object.toString) field 241 points to the name toString. Conversely, because there is no C# equivalent of the toString method, the C# field 242 is null (i.e. empty). Because the C# name field is null, then the reflection library will automatically recognize that the toString method should not be shown to C# methods. The toString method 240 can also include a pointer to a toString method implementation 262. The third method 250 is ToString method. The ToString method is a C# method only i.e. a C#-only method, therefore the C# name (System.Object.ToString) field 252 points to the name ToString and the Java name field 251 is null. Because the Java name field 251 is null, the Java reflection library will not show this method. The ToString method 250 can also include a pointer to a ToString method implementation 263. For efficiency, other methods of marking Java-only, C#-only and Java-and-C# methods can also be used.

In alternative embodiments, an approach similar to that described above for methods can also be used for fields such that the object can contain Java-only, C#-only and Java-and-C# fields. The characteristics of the fields, including the Java and C# names of the fields, are described in a field data structures. The class data structure contains a field that stores the number of fields defined in that the class and another field that points to an array of pointers to field structures.

Figure 3:
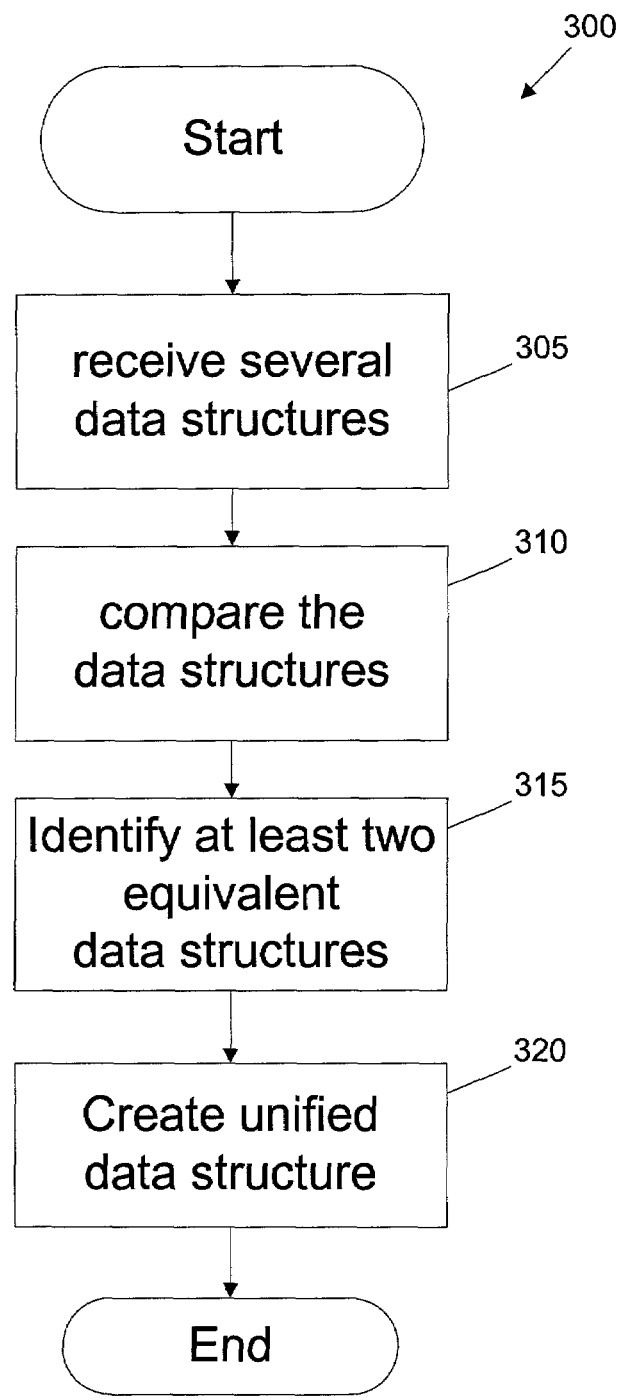
FIG. 3 shows a process 300 of identifying equivalent data structures.

FIG. 3 shows a process 300 of identifying equivalent data structures. First, in block 305, several data structures are received. Each one of the data structures is from a different programming language. Next, the data structures are compared in block 310 and at least two data structures that have identical implementations are identified in block 315. In one embodiment, the data structures with identical implementations are unified to create a unified data structure in block 320. The unified data structure includes one implementation of the identified data structures and the names of the identified data structures that correspond to the respective programming languages. The unified data structure can also include additional data structures that do not have equivalents such as the toString 240 and ToString 250 methods shown in FIG. 2 above, in one embodiment, the data structures that do not have equivalents will include a name from each of the programming languages and those programming languages that do not include an equivalent, can have a null name as described above in FIG. 2.

Figure 4:
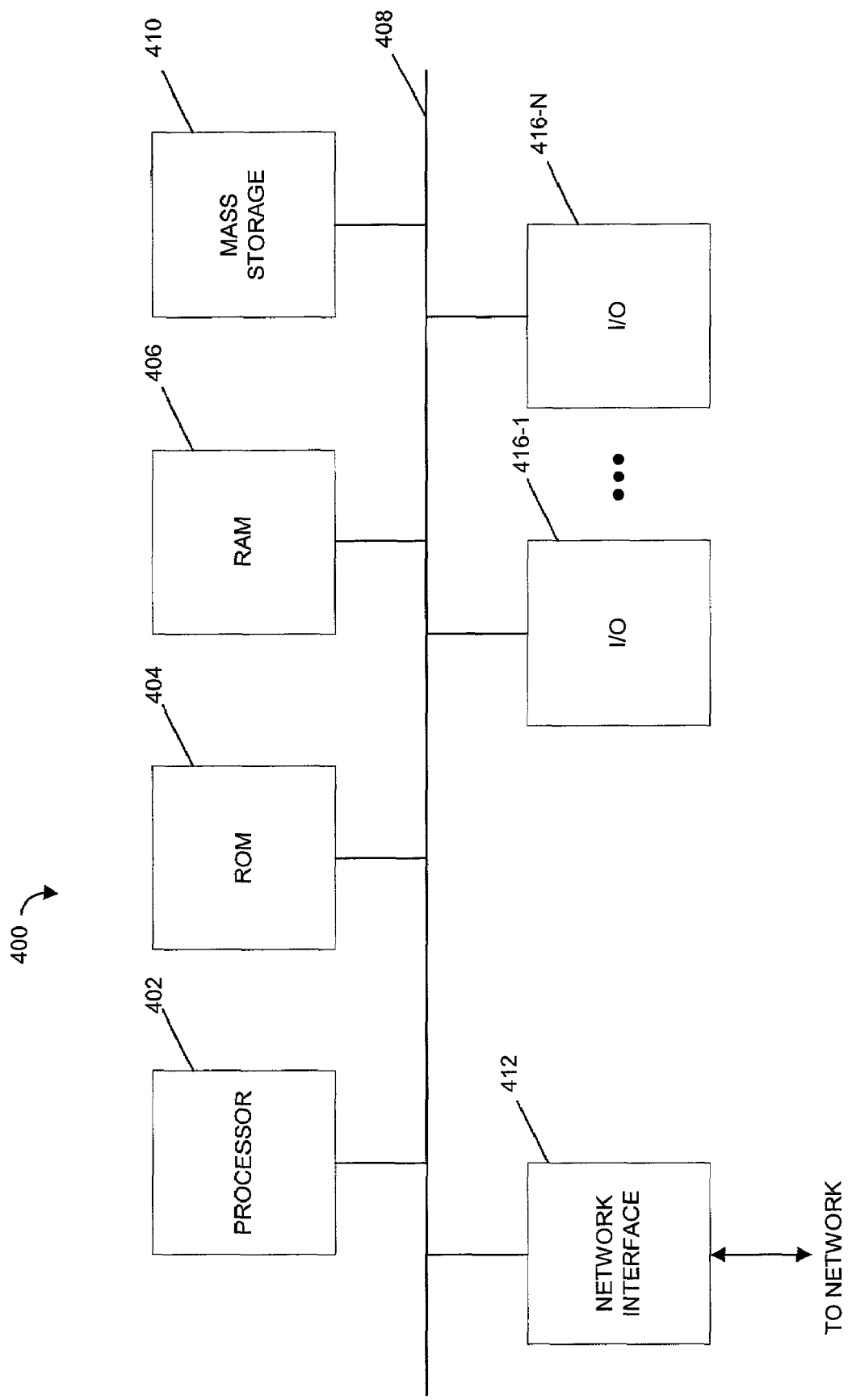
FIG. 4 illustrates a high-level block diagram of a computer system.

FIG. 4 illustrates a high-level block diagram of a computer system representative of any computer such as a personal computer (PC) or a server or other type of computer system. As shown, the computer system includes a processor 402, ROM 404, RAM 406, and a mass storage device 410 each connected to a bus system 408. The bus system 408 may include one or more buses connected to each other through various bridges, controllers and/or adapters, such as are well known in the art. For example, the bus system 408 may include a "system bus" that is connected through an adapter to one or more expansion buses, such as a Peripheral Component Interconnect (PCI) bus. Also coupled to the bus system 408 are a network interface 412, and a number (N) of input/output (I/O) devices 416-1 through 416-N.

I/O devices 416-1 through 416-N may include, for example, a keyboard, a pointing device, a display device and/or other conventional I/O devices. Mass storage device 410 may include any suitable device for storing large volumes of data, such as a magnetic disk or tape, magnetooptical (MO) storage device, or any of various types of Digital Versatile Disk (DVD) or Compact Disk (CD) based storage.

Network interface 412 provides data communication between the computer system and other computer systems such as on a network. Hence, network interface 412 maybe any device suitable for or enabling the computer system 400 to communicate data with a remote processing system over a data communication link, such as a conventional telephone modem, an Integrated Services Digital Network (ISDN) adapter, a Digital Subscriber Line (DSL) adapter, a cable modem, a satellite transceiver, an Ethernet adapter, or the like.

Of course, many variations upon the architecture shown in FIG. 4 can be made to suit the particular needs of a given system. Thus, certain components may be added to the components shown in FIG. 4 for given system, or certain components shown in FIG. 4 may be omitted from the given system.

It will be further appreciated that the instructions represented by the blocks in FIG. 3 is not required to be performed in the order illustrated, and that all the processing represented by the blocks may not be necessary to practice the invention.

One skilled in the art will immediately appreciate that the invention can be practiced with other computer system configurations, including multiprocessor systems, minicomputers, mainframe computers, and the like. The invention can also be practiced in distributed computing environments where tasks are performed by remote processing devices that are linked through a communications network.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A data structure stored on a computer readable storage medium, the data structure comprising:
    a table for virtual method dispatch and type identification, wherein the table includes a plurality of pointers, wherein the plurality of pointers point to a plurality of classes and wherein the plurality of classes include at least one unified type hierarchy;
    wherein the unified type hierarchy includes a first name from a first programming language, wherein the first name identifies an assigned object in the first programming language;
    a second name from a second programming language, wherein the second name identifies the assigned object in the second programming language; and
    a pointer to an implementation of the assigned object.

2. The data structure of claim 1 wherein if the assigned object is not identified in the first programming language, then the first function name is a null.

3. The data structure of claim 1 wherein the unified type hierarchy includes:
    a data structure that is recognizable by a first programming language and a second programming language.

4. The data structure of claim 1 wherein the data structure is a data structure for use in two or more hierarchical programming languages.

5. The data structure of claim 1 wherein the data structure is a data structure for use in two or more object-oriented programming languages.

6. The data structure of claim 5 wherein the two or more object-oriented programming languages include at least two of a group consisting of:
    Java, C# (C Sharp), C++, Smalltalk, and Eiffel.

7. The data structure of claim 1 further comprising:
    a root identifying each one of a plurality of programming languages wherein the data structure is recognizable in each one of the plurality of programming languages.

8. A computer system comprising:
    a processor;
    an input/output system coupled to the processor via a bus system;
    a memory system coupled to the bus, wherein the memory system includes processor executable instructions that when executed configure the processor to
    receive a plurality of data structures, wherein the each one of the plurality of data structures are from a different one of the plurality of programming languages;
    compare the implementation of each one of the plurality of data structures;
    identify at least two of the plurality of data structures that have identical implementations; and
    eliminate one of the identical implementations to create a unified data structure recoanizable by the plurality of programming languages for a table for virtual method dispatch and type identification.

9. The system of claim 8, further comprising a network adapter coupled to the bus system and wherein the network adapter is coupled to a computer network.

10. The system of claim 8 wherein the plurality of programming languages include at least two of a group consisting of Java, C# (C Sharp), C++, Smalltalk, and Eiffel.

11. The system of claim 8, wherein the memory system further includes processor executable instructions that when executed configure the processor to:
    create the unified data structure to contain names of the at least two of the plurality of data structures for the corresponding ones of the plurality of programming languages.

12. A method implemented on a data processing system, the method comprising:
    receiving a plurality of data structures, wherein the each one of the plurality of data structures are from a different one of a plurality of programming languages;
    comparing the implementation of each one of the plurality of data structures;
    identifying at least two of the plurality of data structures that have identical implementations; and
    creating a unified data structure wherein the unified data structure includes
    a first name from a first programming language, wherein the first name identifies one of the identified data structures in the first programming language;
    a second name from a second programming language, wherein the second name identifies one of the identified data structures in the second programming language; and
    a pointer to an implementation of the identified data structures.

13. The method of claim 12 wherein the plurality of names of the identified at least two data structures includes names that correspond to the respective one of the plurality of programming languages for each of the at least two data structures.

14. A computer system comprising:
a processor;
an input/output system coupled to the processor via a bus system;
a memory system coupled to the bus, wherein the memory system includes processor executable instructions that when executed configure the processor to
  receive a plurality of data structures, wherein the each one of the plurality of data structures are from a different one of a plurality of programming languages;
  compare the implementation of each one of the plurality of data structures;
  identify at least two of the plurality of data structures that have identical implementations; and
  create a unified data structure wherein the unified data structure includes
    a first name from a first programming language, wherein the first name identifies one of the identified data structures in the first programming language;
    a second name from a second programming language, wherein the second name identifies one of the identified data structures in the second programming language; and
    a pointer to an implementation of the identified data structures.

15. The system of claim 14 wherein the plurality of programming languages include at least two of a group consisting of Java, C# (C Sharp), C++, Smalltalk, and Eiffel.

16. The system of claim 14 wherein the plurality of names of the identified at least two data structures includes names that correspond to the respective one of the plurality of programming languages for each of the at least two data structures.

17. A method implemented on a data processing system, the method comprising:
  receiving a plurality of data structures, wherein the each one of the plurality of data structures are from a different one of a plurality of programming languages;
  comparing the implementation of each one of the plurality of data structures;
  identifying at least two of the plurality of data structures that have identical implementations; and
  eliminating one of the identical implementations to create a unified data structure recognizable by the plurality of programming languages for a table for virtual method dispatch and type identification.

18. The method of claim 17 wherein the plurality of programming languages include at least two of a group consisting of Java, C# (C Sharp), C++, Smalltalk, and Eiffel.

* * * * *